United States Patent
Kishiyama et al.

(10) Patent No.: US 10,805,055 B2
(45) Date of Patent: Oct. 13, 2020

(54) COMMUNICATION SYSTEM, MOBILE TERMINAL APPARATUS, LOCAL AREA BASE STATION APPARATUS AND COMMUNICATION METHOD

(71) Applicant: NTT DOCOMO, INC., Tokyo (JP)

(72) Inventors: Yoshihisa Kishiyama, Tokyo (JP); Kazuaki Takeda, Tokyo (JP); Satoshi Nagata, Tokyo (JP); Takehiro Nakamura, Tokyo (JP); Hideaki Takahashi, Tokyo (JP); Sadayuki Abeta, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/416,295

(22) PCT Filed: Jun. 27, 2013

(86) PCT No.: PCT/JP2013/067686
§ 371 (c)(1),
(2) Date: Jan. 22, 2015

(87) PCT Pub. No.: WO2014/017251
PCT Pub. Date: Jan. 30, 2014

(65) Prior Publication Data
US 2015/0172034 A1 Jun. 18, 2015

(30) Foreign Application Priority Data

Jul. 25, 2012 (JP) ................................ 2012-165175

(51) Int. Cl.
*H04L 5/00* (2006.01)
*H04J 11/00* (2006.01)
(Continued)

(52) U.S. Cl.
CPC ........ *H04L 5/0073* (2013.01); *H04J 11/0069* (2013.01); *H04J 13/16* (2013.01);
(Continued)

(58) Field of Classification Search
CPC ..... H04L 5/0073; H04L 5/005; H04L 5/0032; H04J 11/0069; H04J 13/16;
(Continued)

(56) References Cited

U.S. PATENT DOCUMENTS

| 7,489,919 | B2 * | 2/2009 | Cheng | ................... H04W 12/06 370/331 |
| 8,542,707 | B2 | 9/2013 | Hou et al. | |

(Continued)

FOREIGN PATENT DOCUMENTS

| CN | 101772028 A | 7/2010 |
| EP | 2330850 A1 | 6/2011 |

(Continued)

OTHER PUBLICATIONS

International Search Report for corresponding International Application No. PCT/JP2013/067686, dated Jul. 30, 2013 (2 pages).
(Continued)

*Primary Examiner* — Kwang B Yao
*Assistant Examiner* — Syed M Bokhari
(74) *Attorney, Agent, or Firm* — Osha Liang LLP

(57) ABSTRACT

A system for supporting smooth mobility of a mobile terminal apparatus between a plurality of local areas that are arranged in a wide area is disclosed. The system includes a wide area base station apparatus that covers a wide area, a local area base station apparatus that covers a local area arranged in the wide area, and a mobile terminal apparatus that can communicate with the wide area base station apparatus and the local area base station apparatus, and is configured to scramble a data signal and a reference signal
(Continued)

by a scrambling sequence that is common between a plurality of local areas in communication between the local area base station apparatus and the mobile terminal apparatus.

9 Claims, 10 Drawing Sheets

(51) Int. Cl.
*H04J 13/16* (2011.01)
*H04W 36/00* (2009.01)
*H04W 36/04* (2009.01)
*H04W 16/32* (2009.01)
*H04W 84/04* (2009.01)
*H04W 88/02* (2009.01)
*H04W 88/08* (2009.01)

(52) U.S. Cl.
CPC ............ *H04L 5/005* (2013.01); *H04L 5/0032* (2013.01); *H04W 36/0069* (2018.08); *H04W 36/04* (2013.01); *H04J 2211/001* (2013.01); *H04W 16/32* (2013.01); *H04W 84/045* (2013.01); *H04W 88/02* (2013.01); *H04W 88/08* (2013.01)

(58) Field of Classification Search
CPC . H04J 2211/001; H04W 36/04; H04W 36/00; H04W 16/32; H04W 88/08; H04W 84/045
USPC ................ 370/329, 331, 338, 354, 328, 330
See application file for complete search history.

(56) References Cited

U.S. PATENT DOCUMENTS

| | | | | |
|---|---|---|---|---|
| 8,599,763 | B2* | 12/2013 | Vitthaladevuni | H04L 1/02 370/328 |
| 8,929,551 | B2* | 1/2015 | Khandekar | H04J 13/10 380/270 |
| 2008/0019306 | A1* | 1/2008 | Damnjanovic | H04W 74/002 370/329 |
| 2009/0041240 | A1 | 2/2009 | Parkvall et al. | |
| 2009/0109919 | A1* | 4/2009 | Bertrand | H04L 27/2633 370/330 |
| 2009/0270103 | A1* | 10/2009 | Pani | H04W 36/0083 455/436 |
| 2010/0034161 | A1 | 2/2010 | Luo et al. | |
| 2010/0111035 | A1* | 5/2010 | Eskicioglu | H04W 36/04 370/331 |
| 2010/0278141 | A1* | 11/2010 | Choi-Grogan | H04W 36/0083 370/331 |
| 2010/0330994 | A1 | 12/2010 | Matsuo et al. | |
| 2011/0077038 | A1* | 3/2011 | Montojo | H04B 7/024 455/507 |
| 2011/0244902 | A1* | 10/2011 | Kim | H04W 76/11 455/507 |
| 2011/0287777 | A1 | 11/2011 | Yu | |
| 2012/0020326 | A1 | 1/2012 | Zhang et al. | |
| 2013/0021986 | A1* | 1/2013 | Bhattad | H04W 28/18 370/329 |
| 2013/0079020 | A1 | 3/2013 | Shahid et al. | |
| 2013/0195041 | A1* | 8/2013 | Papasakellariou | H04W 72/042 370/329 |
| 2013/0251059 | A1* | 9/2013 | Jitsukawa | H04B 7/04 375/267 |
| 2013/0336264 | A1* | 12/2013 | Hsuan | H04L 12/5692 370/329 |
| 2014/0254521 | A1* | 9/2014 | Fong | H04L 5/0053 370/329 |

FOREIGN PATENT DOCUMENTS

| | | |
|---|---|---|
| JP | 2009-207108 A | 9/2009 |
| JP | 2010-536236 A | 11/2010 |
| JP | 2011-526439 A | 10/2011 |
| JP | 2011530892 A | 12/2011 |
| WO | 2010/135258 A1 | 11/2010 |
| WO | 2011/041598 A2 | 4/2011 |
| WO | 2011/057717 A1 | 5/2011 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).
Extended European Search Report issued in the counterpart European Patent Application No. 13823819.1, dated Feb. 12, 2016 (7 pages).
Office Action issued in corresponding Japanese Application No. 2012-165175, dated Apr. 19, 2016 (5 pages).
Office Action in counterpart Japanese Patent Application No. 2012-165175, dated Jul. 12, 2016 (9 pages).
Office Action issued in corresponding Chinese Application No. 201380038086.0, dated Jul. 31, 2017 (17 pages).
Ericsson, ST-Ericsson; "Aspects on Distributed RRUs with Shared Cell-ID for Heterogeneous Deployments"; 3GPP TSG-RAN WG1 #64, R1-110649; Taipei, Taiwan; Feb. 21-25, 2011 (14 pages).
Office Action issued in the counterpart Chinese Patent Application No. 201380038086.0, dated Apr. 3, 2018 (7 pages).
Office Action issued in counterpart India Application No. 136/KOLNP/2015, dated Aug. 28, 2019 (6 Pages).
Office Action issued in Chinese Application No. 201810618332.4, dated Jun. 2, 2020 (17 pages).

* cited by examiner

FREQUENCY CARRIER FOR WIDE AREA

FREQUENCY CARRIER FOR LOCAL AREA

COMMUNICATION SYSTEM, MOBILE TERMINAL APPARATUS, LOCAL AREA BASE STATION APPARATUS AND COMMUNICATION METHOD

TECHNICAL FIELD

The present invention relates to a communication system, a mobile terminal apparatus, a local area base station apparatus and a communication method in a next-generation mobile communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Also, successor systems of LTE (referred to as, for example, "LTE-advanced" or "LTE enhancement" (hereinafter referred to as "LTE-A")) are under study for the purpose of achieving further broadbandization and increased speed beyond LTE. In LTE-A (Rel-10), carrier aggregation to group a plurality of component carriers (CCs), where the system band of the LTE system is one unit, for broadbandization, is used. Also, in LTE-A, a HetNet (Heterogeneous Network) configuration to use interference coordination techniques (eICIC: enhanced Inter-Cell Interference Coordination) is under study.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Now, in cellular systems such as W-CDMA, LTE (Rel. 8), and successor systems of LTE (for example, Rel. 9 and Rel. 10), the radio communication schemes (radio interfaces) are designed to support wide areas. In the future, it is expected that high-speed wireless services by means of short range communication will be provided in local areas such as indoors, shopping malls and so on, in addition to the cellular environment such as above. Consequently, numerous local areas are arranged in a wide area, and high mobility is required between the local areas.

The present invention has been made in view of the above, and it is therefore an object of the present invention to provide a communication system, a mobile terminal apparatus, a local area base station apparatus and a communication method that can support smooth mobility between local areas.

Solution to Problem

The communication system of the present invention provides a communication system including a wide area base station apparatus that covers a wide area, a local area base station apparatus that covers a local area arranged in the wide area, and a mobile terminal apparatus that can communicate with the wide area base station apparatus and the local area base station apparatus, and in this communication system, in communication between the local area base station apparatus and the mobile terminal apparatus, a data signal and/or a reference signal are scrambled by a scrambling sequence that is common between a plurality of local areas.

Technical Advantage of the Invention

According to the present invention, scrambling that is common between a plurality of local areas is applied to data signals and/or reference signals, so that even, when a mobile terminal apparatus moves across local areas, the scrambling is not changed. Therefore, it is possible to support smooth mobility between local areas.

DESCRIPTION OF EMBODIMENTS

Figure 1:
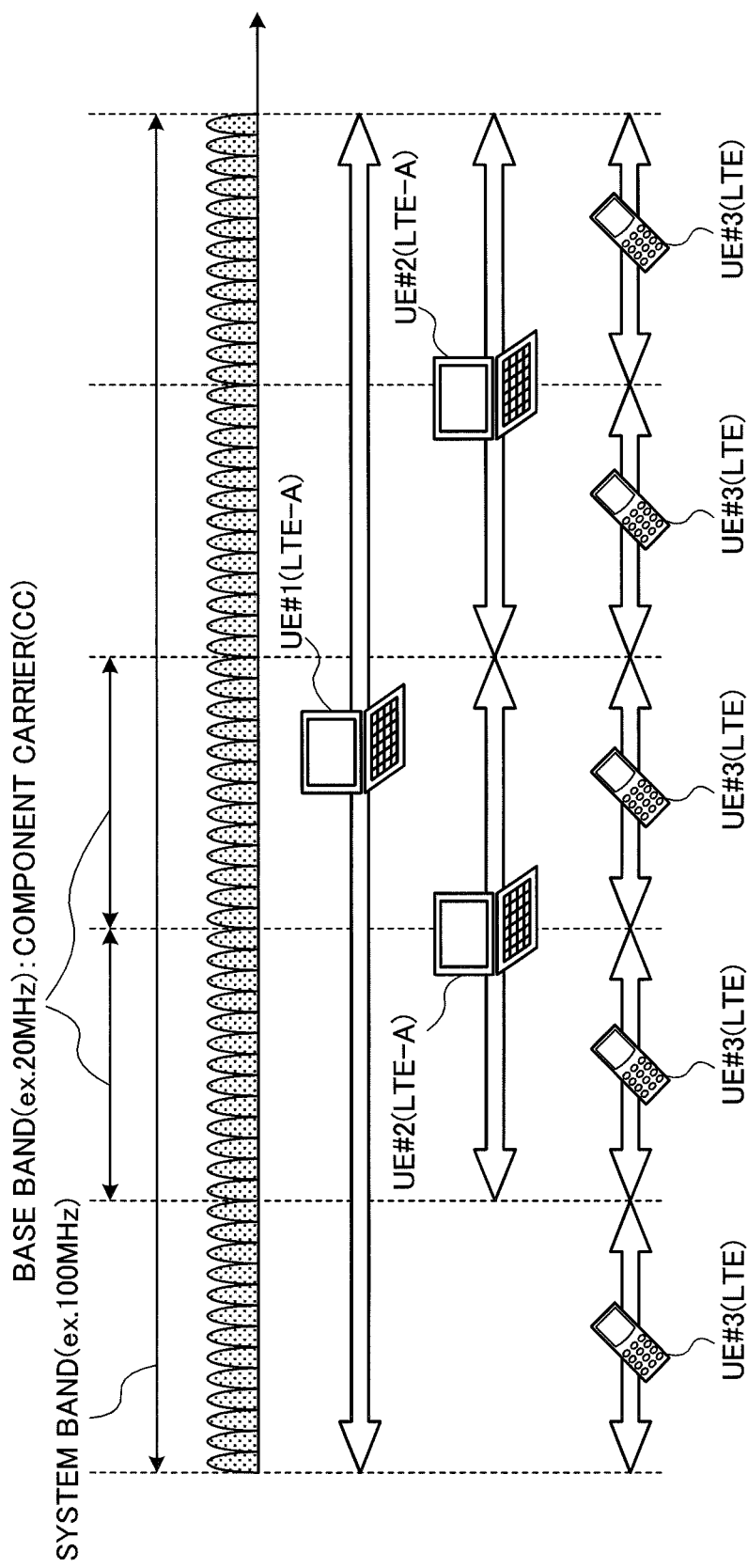
FIG. 1 is a diagram to explain a system band of an LTE-A system.

FIG. 1 is a diagram to show a layered bandwidth configuration defined in LTE-A. The example shown in FIG. 1 is a layered bandwidth configuration that is assumed when an LTE-A system having a first system band formed with a plurality of fundamental frequency blocks (hereinafter referred to as "component carriers"), and an LTE system having a second system band formed with one component carrier, coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit. Widening a band by gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and is able to support a system band up to 100 MHz. UE #2 is a mobile terminal apparatus to support the LTE-A system (and also support the LTE system), and is able to support a system band up to 40 MHz (20 MHz×2=40 MHz). UE #3 is a mobile terminal apparatus to support the LTE system (and not support the LTE-A system), and is able to support a system band up to 20 MHz (base band).

Figure 2A:
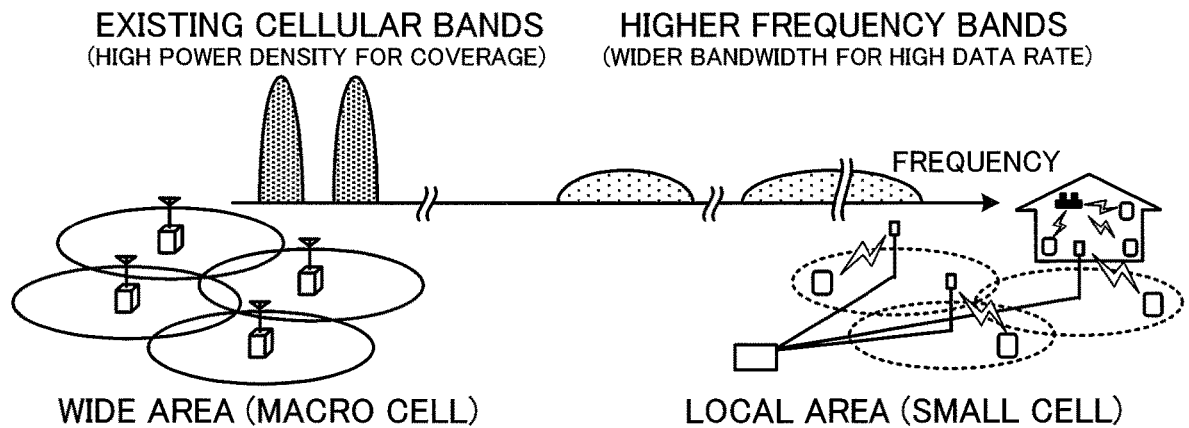
FIG. 2 provides diagrams to show a heterogeneous network configuration.

Now, in future systems, a heterogeneous network configuration, which overlays numerous local areas (small cells) in a wide area (macro cell), is under study. In the heterogeneous network configuration like this, a configuration to employ the same carrier between wide areas and local areas, and a configuration to execute carrier aggregation by employing different carriers may be possible. As shown in FIG. 2A, in a configuration to employ different carriers between wide areas and local areas, the wide areas are operated with low frequency bands (for example, 2 GHz), and the local areas are operated with high frequency bands (for example, 3.5 GHz or more).

Figure 2B:
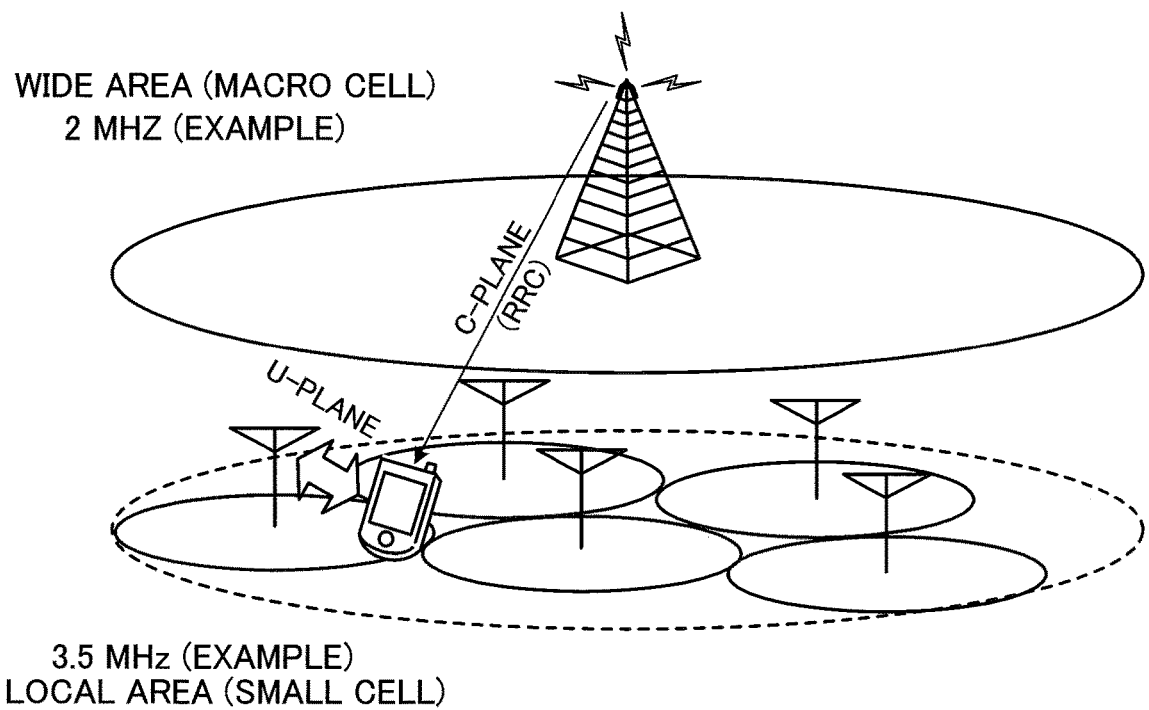

That is, wide areas secure wide coverage by supporting high transmission power density with low frequency bands. Meanwhile, local areas realize high-speed wireless service by short range communication by securing capacity with high frequency bands. Consequently, as shown in FIG. 2B, a wide area and local areas support C-plane to transmit control signals and U-plane to transmit data signals separately. By this means, while the wide area supports coverage and high connectablilty when a mobile terminal apparatuses moves, the local areas secure capacity and are able to realize high-speed transmission.

Also, as a demand apart from capacity, support for saved power consumption and random cell planning is required to local areas. Consequently, for local areas, it is necessary to design a frequency carrier that is specialized for local areas. Considering interference that arises from saved power consumption and random cell planning, it is preferable to configure a frequency carrier for local areas that assumes non-transmission when there is no traffic. Consequently, the frequency carrier for local areas is designed in an NCT (New Carrier Type), which is UE-specific as much as possible and new. Note that, although an NCT is designed to be a new carrier type that is different from conventional carriers, this new carrier type may be referred to as "additional carrier type" or may be referred to as "extension carrier type."

The NCT is designed without using the PSS/SSS (Primary Synchronization Signal/Secondary Synchronization Signal), the CRS (Cell-specific Reference Signal), the PDCCH (Physical Downlink Control Channel) and so on in LTE, and designed based on the ePDCCH (enhanced Physical Downlink Control Channel) and the DM-RS (Demodulation-Reference Signal). Here, the ePDCCH uses a predetermined frequency band in the PDSCH region (data signal region) as a PDCCH region (control signal region). The ePDCCH allocated to the PDSCH region is demodulated using the DM-RS. Note that the ePDCCH may be referred to as "FDM-type PDCCH" or may be referred to as "UE-PDCCH."

Now, as shown in following formula 1, a shared data channel of LTE is scrambled by scrambling sequences that are provided based on cell IDs and C-RNTIs (Cell Radio Network Temporary Identifiers) as terminal identifier information.

[1]

$$c_{init} = n_{RNTI} \cdot 2^{14} + q \cdot 2^{13} + \lfloor n_s/2 \rfloor \cdot 2^9 + N_{ID}^{cell} \quad \text{(Formula 1)}$$

Note that $n_{RNTI}$ is a value related to C-RNTI (user ID), and $N^{cell}_{ID}$ is a value related to the cell ID. Also, q is a value related to the stream, and $n_s$ is the slot number. Also, the RNTI (Radio Network Temporary Identifier) shows a terminal identifier for shared data channel transmission.

Figure 3:
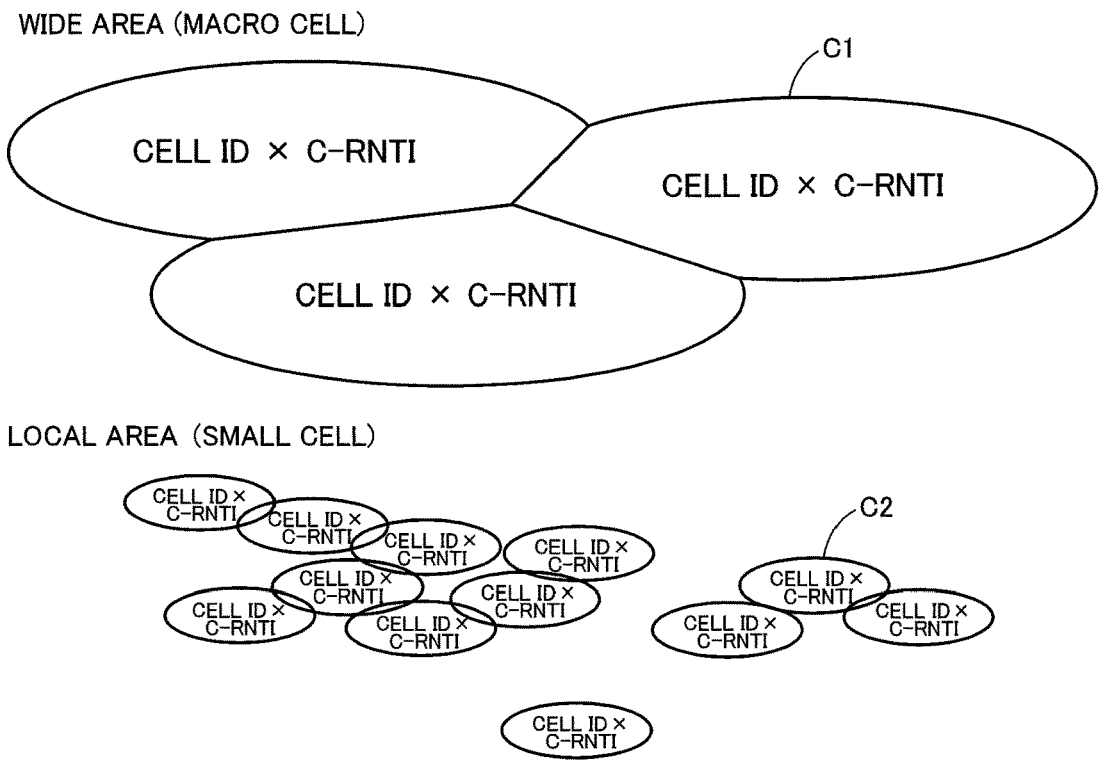
FIG. 3 is a diagram to explain a conventional scrambling method.

In this way, scrambling sequences are related to cell IDs and C-RNTIs. In a wide area, which is a macro cell, data signals are scrambled using the cell ID of the macro cell and C-RNTIs, which are assigned in the macro cell. Local areas, which are small cells, are designed to be UE-specific as described above, so the concept of conventional (Rel. 10 and earlier versions) cell IDs does not apply. In this case, as shown in FIG. 3, a scheme to assign cell IDs to local areas C2 individually, and scramble data signals based on cell IDs and C-RNTIs also in the local areas C2, similar to a wide area C1, may be possible.

However, there is a problem that cell IDs should be assigned per local area C2, and cell planning becomes complicated when incorporating the local areas C2. Furthermore, since scrambling is changed every time when a terminal apparatus carries out handover across local areas C2, it is not possible to support smooth mobility between local areas. So, the present inventors have arrived at the present invention in order to suppress changes in scrambling upon handover between local areas C2, where there is no concept of area identifiers such as cell IDs. That is, a gist of the present invention is to realize smooth mobility between local areas C2 by scrambling a shared data channel by a common scrambling sequence between a plurality of local areas C2 without making cell planning complex.

Now, scrambling methods of data signals in the local areas will be described with reference to FIGS. 4 to 8. For ease of explanation, FIG. 4 to FIG. 8 each explain an example where a wide area is a macro cell and local areas are small cells. Note that a wide area is a concept that includes a macro cell, a sector cell, and so on. A local area is a concept that includes a small cell, a phantom cell, a pico cell, a nano cell, a phemto cell, a micro cell and so on, and may be provided outdoors as well as indoors. Also, assume that a mobile terminal apparatus is connected to a wide area by a wide area frequency carrier, and connected to local areas by a local area frequency carrier. Note that although scrambling methods for data signals will be described here, it is also possible to scramble reference signals with the same methods.

Figure 4:
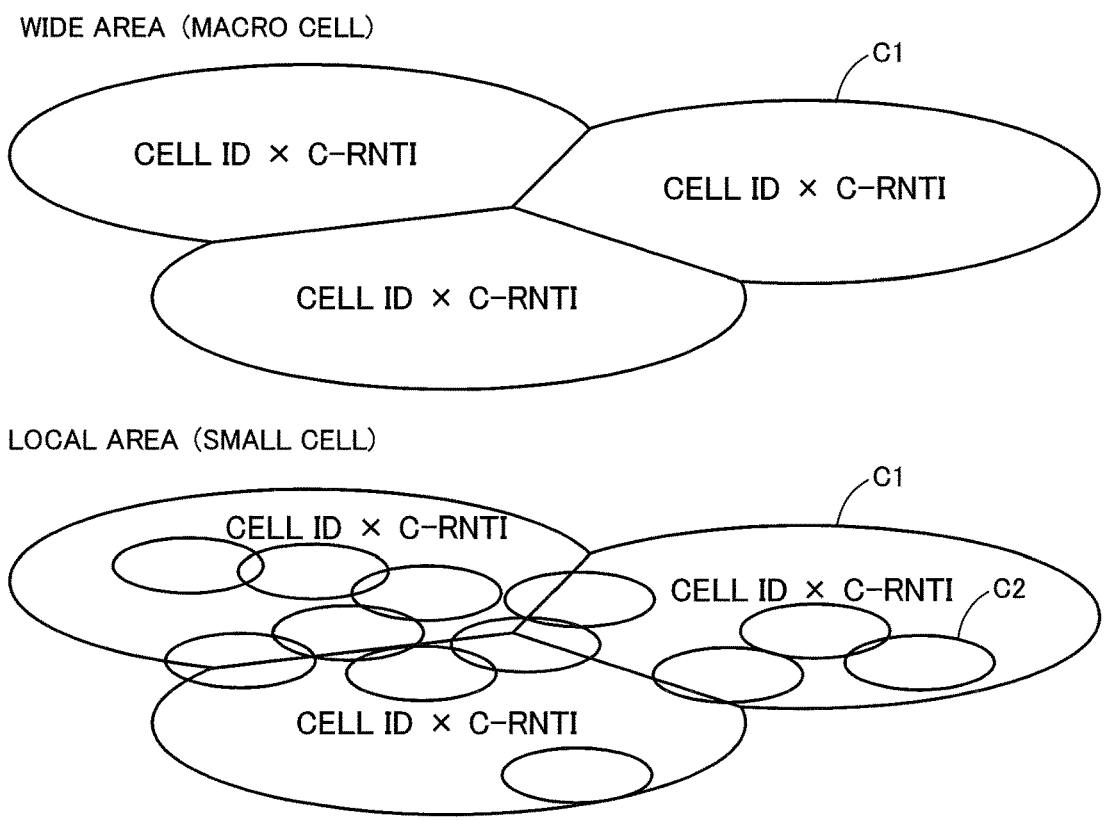
FIG. 4 is a diagram to explain a first scrambling method.

An example of a first scrambling method for data signals in local areas will be described with reference to FIG. 4. As shown in formula 2, the first scrambling method is a method to scramble data signals by scrambling sequence provided based on the cell ID and C-RNTI (user ID) of a wide area C1.

[2]

$$c_{init} = n_{RNTI} \cdot 2^{14} + q \cdot 2^{13} + \lfloor n_s/2 \rfloor \cdot 2^9 + N_{ID}^{cell} \quad \text{(Formula 2)}$$

Note that $n_{RNTI}$ is a value related to C-RNTI of the wide area C1, and $N^{cell}_{ID}$ is a value related to the cell ID of the wide area C1. Also, q is a value related the stream, and $n_s$ is the slot number.

In the wide area C1, which is a macro cell, uplink and downlink data signals are scrambled by scrambling sequence provided based on the cell ID and C-RNTI of the wide area C1. Also, in the local areas C2, which are small cells, uplink and downlink data signals are scrambled by scrambling sequence provided based on the cell ID and C-RNTI of the wide area C1. That is, also in the local areas C2, data signals are scrambled using the same scrambling sequence as the scrambling sequence in the wide area C1. With this configuration, within the same wide area C1, even when a mobile terminal apparatus carries out handover across local areas C2, the scrambling in the local areas C2 is not changed.

As a result of this, common scrambling is applied to data signals in a plurality of local areas C2 that are placed in the same wide area C1. Therefore, it is possible to realize smooth mobility of the mobile terminal apparatus between the local areas C2. Also, the cell ID of the wide area C1 is used for scrambling in the local areas C2 so that cell planning of the local areas C2 is not needed. It is not necessary to assign cell-specific cell IDs to the local areas C2, and therefore, it becomes possible to easily incorporate the local areas C2 in the wide area C1, such that the differences between cells are unrecognized.

Figure 5:
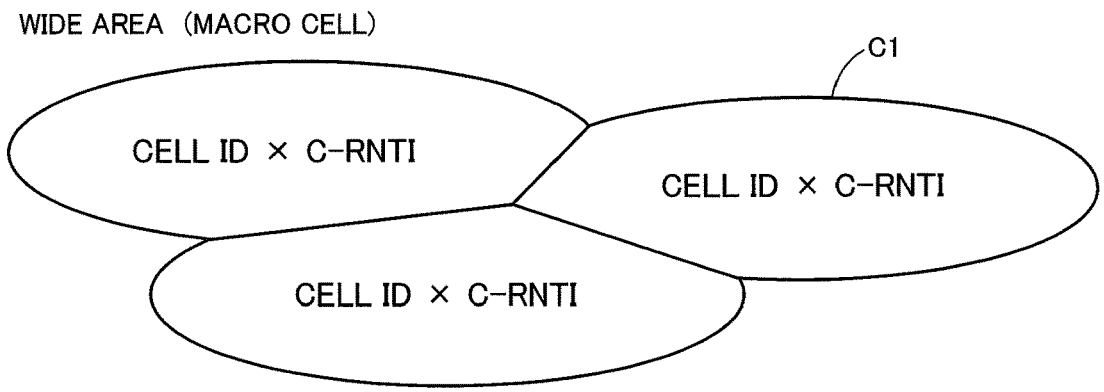
FIG. 5 is a diagram to explain a second scrambling method.
Figure 5:
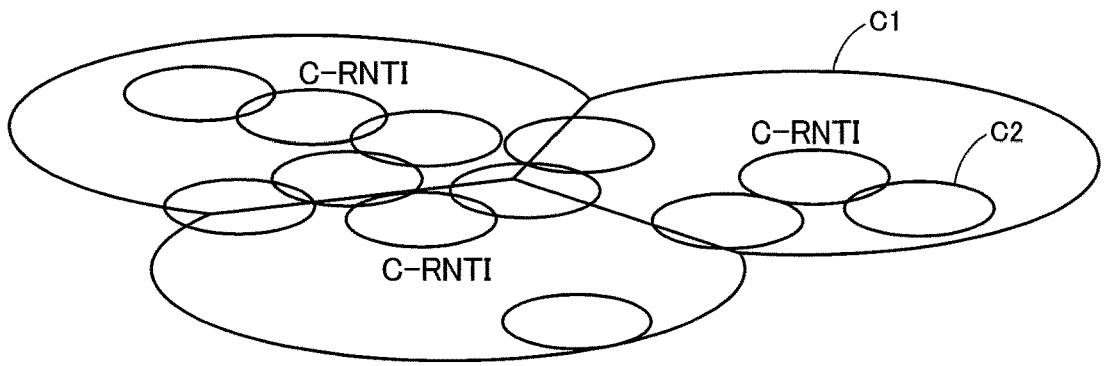

An example of a second scrambling method for data signals in local areas will be described with reference to FIG. 5. As shown in formula 3, the second scrambling method is a method to scramble data signals by scrambling sequence provided based on C-RNTI (user ID) of a wide area C1.

[3]

$$c_{init} = n_{RNTI} \cdot 2^{14} + q \cdot 2^{13} + \lfloor n_s/2 \rfloor \cdot 2^9 + X \qquad \text{(Formula 3)}$$

Note that, $n_{RNTI}$ is a value related to C-RNTI of the wide area C1, and X is 0 or a fixed value. Also, q is a value related to the stream, and $n_s$ is the slot number.

In the wide area C1, which is a macro cell, uplink and downlink data signals are scrambled by scrambling sequence provided based on the cell ID and C-RNTI of the wide area C1. Meanwhile, in the local areas C2, which are small cells, uplink and downlink data signals are scrambled by scrambling sequence provided based on C-RNTI of the wide area C1. That is, in the local areas C2, data signals are scrambled by identifier information for the wide area C1. With this configuration, even if a mobile terminal apparatus carries out handover across local areas C2, scrambling is not changed. At this time, if the same C-RNTI is assigned to the mobile terminal apparatus by a radio network controller (RNC) and so on, there is no influence on scrambling in the local areas C2 even if the mobile terminal apparatus carries out handover across wide areas C1.

As a result of this, if C-RNTI is the same between the wide areas C1, regardless of whether or not a plurality of local areas C2 are in the same wide area C1, common scrambling is applied to the data signals in the local areas C2. Therefore, it is possible to realize smooth mobility of the mobile terminal apparatus between local areas C2. Also, cell IDs are not used for scrambling in the local areas C2 so that cell planning of the local areas C2 is not needed. It is not necessary to assign cell-specific cell IDs to the local areas C2, and therefore, it becomes possible to easily incorporate the local areas C2 in the wide area C1, such that the differences between cells are unrecognized.

Figure 6:
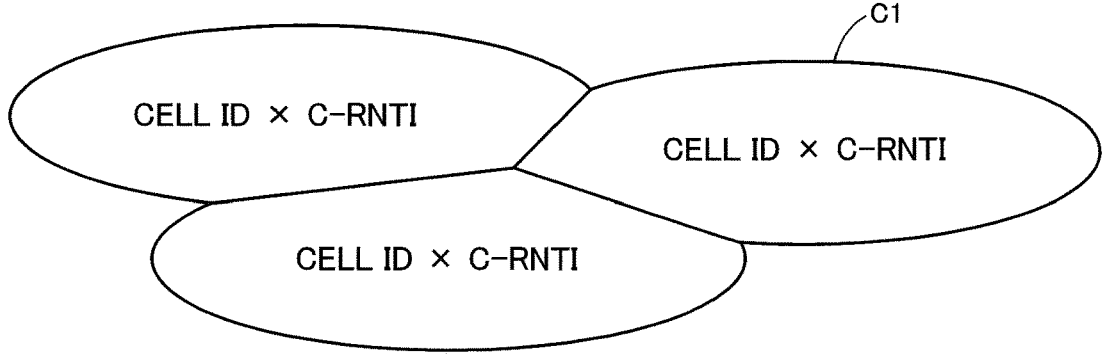
FIG. 6 is a diagram to explain a third scrambling method.
Figure 6:
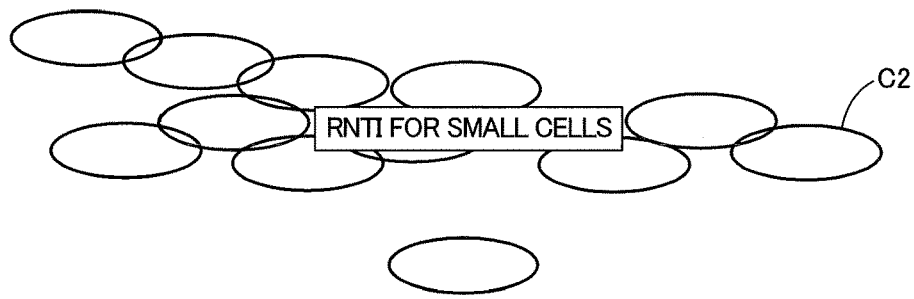

An example of a third scrambling method for data signals in local areas will be described with reference to FIG. 6. As shown in formula 4, the third scrambling method is a method to scramble data signals by scrambling sequence provided based on an RNTI (user ID) that is assigned to a plurality of local areas C2 on a shared basis.

[4]

$$c_{init} = n_{RNTI} \cdot 2^{14} + q \cdot 2^{13} + \lfloor n_s/2 \rfloor \cdot 2^9 + X \qquad \text{(Formula 4)}$$

Note that, $n_{RNTI}$ is a value related to the RNTI that is common between a plurality of local areas C2, and x is 0 or a fixed value. Also, q is a value related to the stream, and $n_s$ is the slot number.

In the wide area C1, which is a macro cell, uplink and downlink data signals are scrambled by scrambling sequence provided based on the cell ID and C-RNTI of the wide area C1. Meanwhile, in the local areas C2, which are small cells, uplink and downlink data signals are scrambled by scrambling sequence provided based on a common RNTI between a plurality of local areas C2. That is, in the local areas C2, data signals are scrambled by an RNTI that is apart from C-RNTI of the wide area C1. With this configuration, even if a mobile terminal apparatus carries out handover across local areas C2, scrambling is not changed. At this time, there is no influence on scrambling in the local areas C2 even if the mobile terminal apparatus carries out handover between wide areas C1.

As a result of this, regardless of whether or not a plurality of local areas C2 are in the same wide area C1, common scrambling is applied to data signals in these local areas C2. Therefore, it is possible to realize smooth mobility of the mobile terminal apparatus between the local areas C2. Also, cell IDs are not used for scrambling in the local areas C2 so that cell planning for the local areas C2 is not needed. It is not necessary to assign cell-specific cell IDs to the local areas C2, and therefore, it becomes possible to easily incorporate the local areas C2 in the wide area C1, such that the differences between cells are unrecognized.

When applying a common RNTI between a plurality of local areas C2, numerous RNTIs are necessary to support a wide area. In this case, it is more effective to increase the number of bits of the RNTI than the number of bits of C-RNTIs for the wide area C1. For example, while conventional C-RNTIs of the wide area are 16 bits, a common RNTI between the local areas C2 may be 24 bits. As a common RNTI between a plurality of local areas C2, a secondary RNTI, which is different from a C-RNTI, may be defined. By this means, in the local areas C2, data signals, which are transmitted in a shared data channel, are scrambled based on the secondary RNTI. Note that the secondary RNTI is not limited to a case where different frequencies, that is, different component carriers, are applied between the wide area C1 and the local areas C2, but is also applicable to a case where the same component carrier is used.

Also, as a common RNTI between a plurality of local areas C2, an RNTI for an NCT (New Carrier Type) of local area C2 may be defined. By this means, in the local areas C2, data signals, which are transmitted in an NCT shared data channel, are scrambled based on the RNTI for the NCT. Furthermore, as a common RNTI between a plurality of local areas C2, an independent C-RNTI may be defined per component carrier. In this case, in addition to the conventional 16 bit C-RNTI, a 24 bit C-RNTI may be defined additionally. By this means, in the local areas C2, data signals, which are transmitted in component carriers for local areas, are scrambled based on the additionally-defined C-RNTI.

Figure 7:
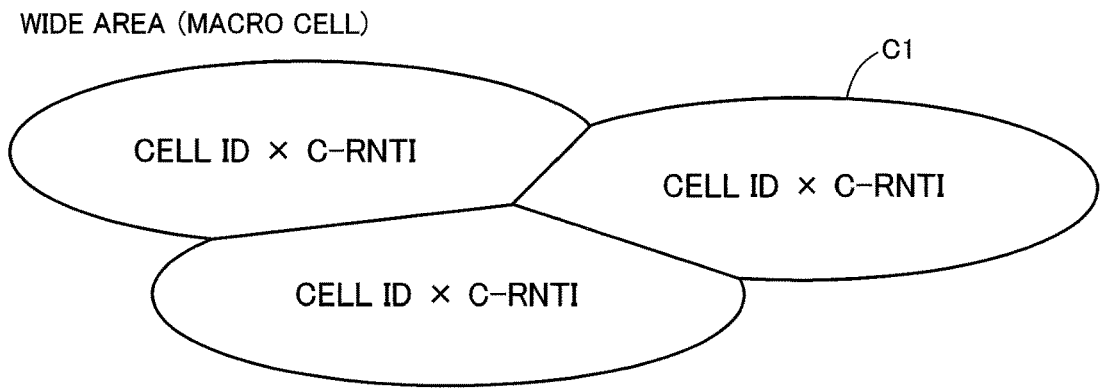
FIG. 7 is a diagram to explain a fourth scrambling method.
Figure 7:
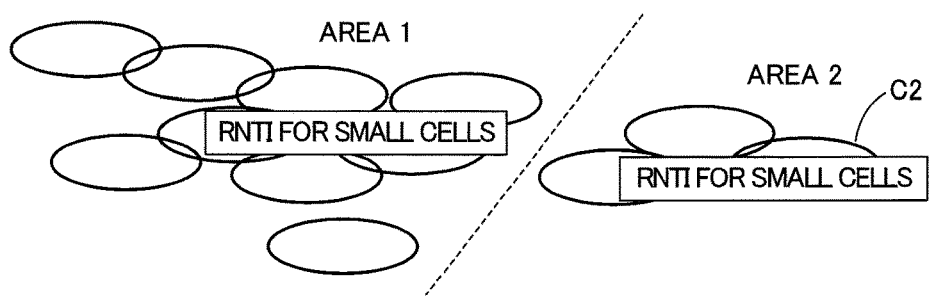

An example of a fourth scrambling method for data signals in local areas will be described with reference to FIG. 7. As shown in formula 5, the fourth scrambling method is a method to scramble data signals by scrambling sequence provided based on an RNTI (user ID) that is assigned to a plurality of local areas C2 on a shared basis and additional IDs that are assigned in addition to the RNTI. [5]

$$c_{init}=n_{RNTI}\cdot 2^{14}+q\cdot 2^{13}+\lfloor n_s/2\rfloor\cdot 2^9+N_{ID} \quad \text{(Formula 5)}$$

Note that $n_{RNTI}$ is a value related to the RNTI that is common between a plurality of local areas C2, and $n_{ID}$ is a value related to the additional IDs. q is a value related to the stream, and $n_s$ is the slot number. Also, the additional IDs are area identifier information of an area where each local area C2 is arranged to belong.

In the wide area C1, which is a macro cell, uplink and downlink data signals are scrambled by scrambling sequence provided based on the cell ID and C-RNTI of the wide area C1. Meanwhile, in the local areas C2, which are small cells, uplink and downlink data signals are scrambled by scrambling sequence provided based on the RNTI that is common between a plurality of local areas C2 and the additional IDs. With this configuration, even if a mobile terminal apparatus carries out handover across local areas C2, scrambling is not changed. At this time, when the additional IDs are area identifier information of areas wider than the wide area C1, even if the mobile terminal apparatus carries out handover between wide areas C1, there is no influence on scrambling in the local areas C2.

As a result of this, regardless of whether or not a plurality of local areas C2 are in the same wide area C1, common scrambling is applied to data signals in these local areas C2. Therefore, it is possible to realize smooth mobility of the mobile terminal apparatus between the local areas C2. Also, cell IDs are not used for scrambling in the local areas C2 so that cell planning of the local areas C2 is not needed. It is not necessary to assign cell-specific cell IDs to the local areas C2, and therefore, it becomes possible to easily incorporate the local areas C2 in the wide area C1, such that the differences between cells are unrecognized. Furthermore, the additional IDs separate the areas where the local areas C2 belong. For this reason, since areas narrower than the third scrambling method have to be supported, it is possible to reduce the number of necessary RNTIs and there is no need to increase the number of RNTI bits.

As a common RNTI between a plurality of local areas C2, similar to the third scrambling method, it is equally possible to define a secondary RNTI, define an RNTI for an NCT, or define an independent C-RNTI per component carrier. Also, additional IDs may only be area identifier information of an area where each local area C2 is arranged to belong. For example, additional IDs may be area IDs or reuse virtual cell IDs which are defined in Rel-11. A method to report the additional IDs to the mobile terminal apparatus may be signaling from the wide area C1 or signaling from the local areas C2. Also, the additional IDs may be reported through, for example, broadcast information or RRC signaling (higher layer signaling).

Figure 8:
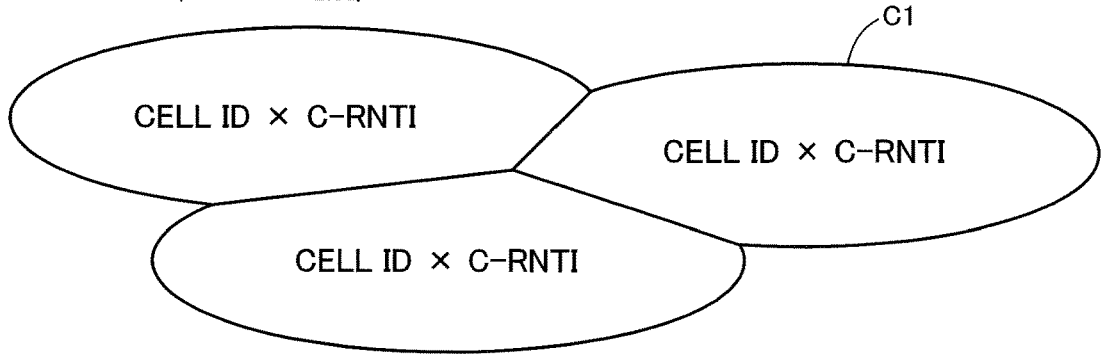
FIG. 8 is a diagram to explain a fifth scrambling method.
Figure 8:
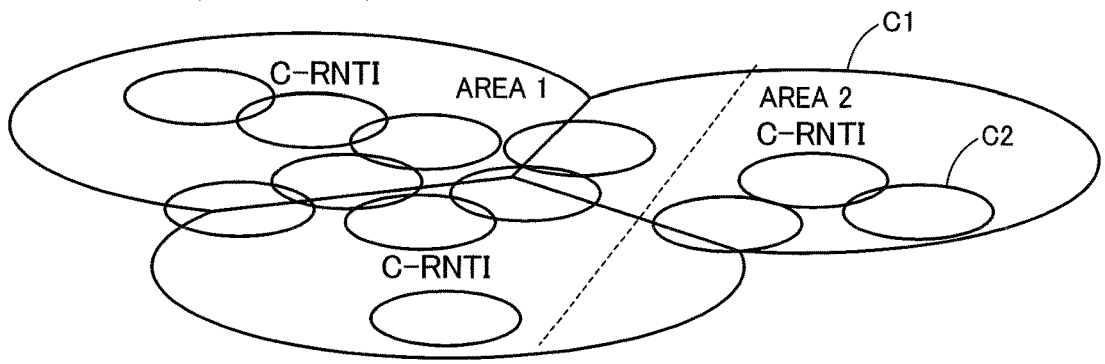

An example of a fifth scrambling method for data signals in local areas will be described with reference to FIG. 8. As shown in formula 6, the fifth scrambling method is a method to scramble data signals by scrambling sequence provided based on C-RNTI (user ID) of a wide area C1 and additional IDs, which are assigned in addition to C-RNTI.

[6]

$$c_{init}=n_{RNTI}\cdot 2^{14}+q\cdot 2^{13}+\lfloor n_s/2\rfloor\cdot 2^9+N_{ID} \quad \text{(Formula 6)}$$

Note that $n_{RNTI}$ is a value related to C-RNTI of the wide area C1, and $n_{ID}$ is a value related to the additional IDs. q is a value related to the stream, and $n_s$ is the slot number. Also, the additional IDs are area identifier information of an area where each local area C2 is placed to belong.

In the wide area C1, which is a macro cell, uplink and downlink data signals are scrambled by scrambling sequence provided based on the cell ID and C-RNTI of the wide area C1. Also, in the local areas C2, which are small cells, uplink and downlink data signals are scrambled by scrambling sequence provided based on C-RNTI of wide area C1 and the additional IDs. Even with such a configuration, common scrambling is applied to data signals between a plurality of local areas C2, so that it is possible to realize smooth mobility of the mobile terminal apparatus between the local areas C2. It is not necessary to assign cell-specific cell IDs to the local areas C2, and therefore, it becomes possible to easily incorporate the local areas C2 in the wide area C1, such that the differences between cells are unrecognized.

Although examples have been shown here where a macro cell is a wide area and a small cell is a local area, these are by no means limiting. The above first to fifth scrambling methods are also applicable to cases where a wide area is a sector cell and a local area is a phantom cell, a pico cell, a nano cell, a femto cell, or a micro cell.

Figure 9:
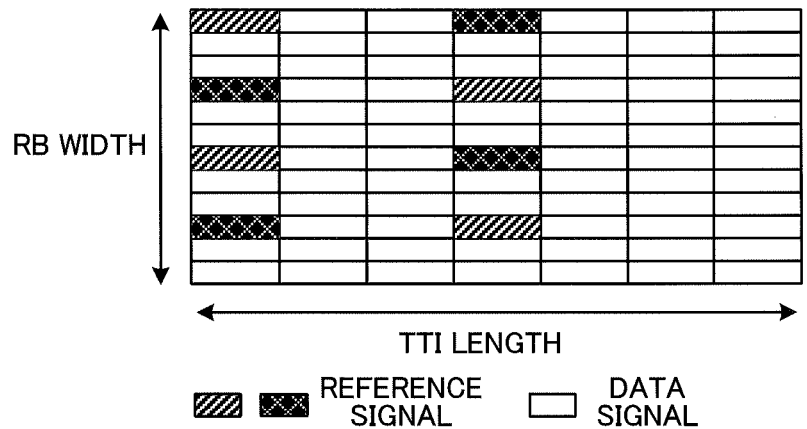
FIG. 9 is a diagram to explain frequency carriers for a wide area and a local area.
Figure 9:
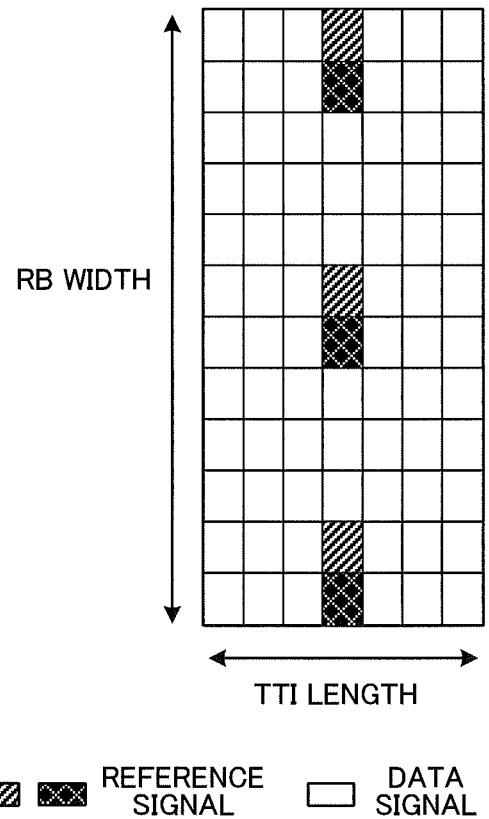

Here, the frequency carrier for the wide area and the frequency carrier for the local areas will be described. As shown in FIG. 9, in the frequency carrier for the wide area, radio resources are allocated in one-resource-block units. One resource block is formed with twelve subcarriers that are consecutive in the frequency direction and fourteen symbols that are consecutive in the time axis direction. Similar to the frequency carrier for the wide area, in the frequency carrier for the local areas, radio resources are allocated in one-resource-block units. The size of these resource blocks is determined by radio parameters.

Here, as radio parameters, the transmission time interval (TTI) length, the round trip delay (RTD), the cyclic prefix (CP) length, the subcarrier interval, and the resource block width will be described. Note that the radio parameters are by no means limited to these. Note that the transmission time interval represents the time duration of the allocation unit of transmission data, and the resource block width represents the bandwidth of the allocation unit of transmission data.

In the wide area, the priority is on securing coverage, so that the TTI length and the RTD are set rather long. By contrast with this, in the local areas, achieving lower delay is prioritized over coverage in order to secure high data rates, so that the TTI length and the RTD are set shorter than in the wide area. Also, since the wide area has a large cell radius, the CP length is set rather long, taking into account comparatively large delayed waves. By contrast with this, since the local areas have a small cell radius, it is not necessary to take into account comparatively large delayed waves, and therefore the CP length is set shorter than in the wide area.

Also, a low frequency band that the influence of the Doppler shift is insignificant is allocated to the wide area, so that the subcarrier interval is set small. By contrast with this, a high frequency band that the influence of the Doppler shift is significant is allocated to the local areas, so that the subcarrier interval is set larger than in the wide area. Also, in the wide area, since the environment varies significantly and the frequency selectivity also fluctuates, the resource block width is set small. By contrast with this, in the local areas, since the environment does not vary so much and the frequency selectivity becomes flat, the resource block width is set large.

Consequently, resource blocks for the wide area, where coverage takes priority, are set to be short in the frequency direction and long in the time axis direction. Resource blocks for the local areas, where achieving lower delay takes priority, are set to be long in the frequency direction and short in the time axis direction. Note that the present invention is by no means limited to configurations to fulfill all of the above-described radio parameter requirements. That is, it suffices to satisfy the requirement of at least one of the TTI length, the RTD, the CP length, the subcarrier interval, and the resource block width.

Also, in the frequency carrier for the wide area, as described above, data signals are scrambled based on the cell ID and C-RNTI of the wide area. Also, reference signals are scrambled based on the cell ID of the wide area. Meanwhile, in the frequency carrier for the local areas, data signals are scrambled based on the above-described first to fifth scrambling methods. Also, reference signals are scrambled in the same way as data signals. In this way, in the local areas, the scrambling method is the same between data signals and reference signals.

Figure 10:
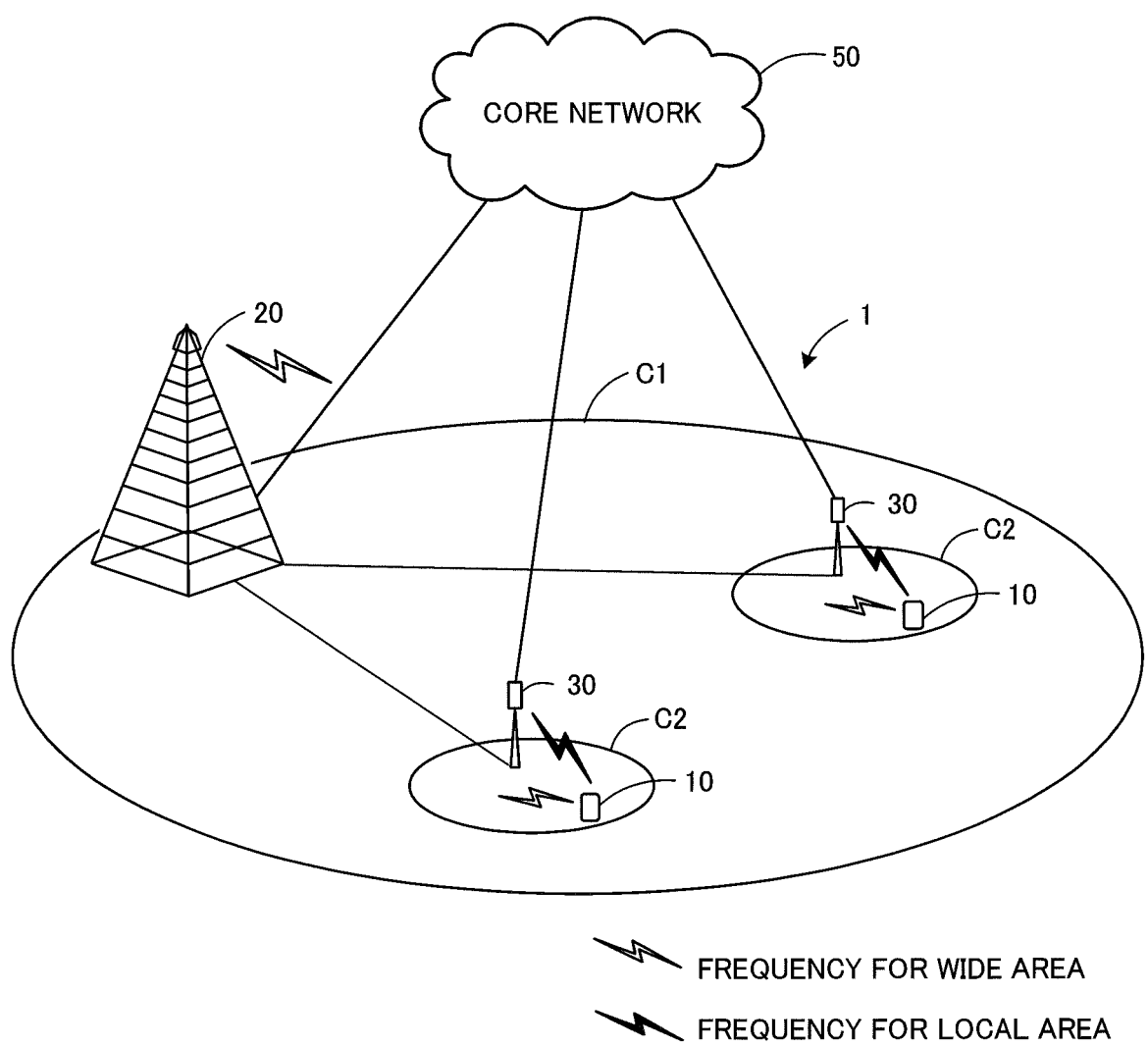
FIG. 10 is a diagram to explain a system configuration of a radio communication system.

Now, a radio communication system according to the present embodiment will be described in detail. FIG. 10 is a diagram to explain a system configuration of a radio communication system according to the present embodiment. Note that the radio communication system shown in FIG. 10 is a system to accommodate, for example, the LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced," or may be referred to as "4G," "FRA" (Future Radio Access) and so on.

As shown in FIG. 10, a radio communication system 1 includes a wide area base station apparatus 20, which covers a wide area C1, and a plurality of local area base station apparatuses 30, which cover a plurality of local areas C2 provided in the wide area C1. Also, in the wide area C1 and each local area C2, many mobile terminal apparatuses 10 are arranged. The mobile terminal apparatuses 10 support the frequency carriers for the wide area and the local areas, and are configured to be able to communicate with the wide area base station apparatus 20 and the local area base station apparatuses 30.

Communication between the mobile terminal apparatuses 10 and the wide area base station apparatus 20 is carried out using the frequency for the wide area (for example, a low frequency band). Communication between the mobile terminal apparatuses 10 and the local area base station apparatuses 30 is carried out using the frequency for the local areas (for example, a high frequency band). Also, the wide area base station apparatus 20 and each local area base station apparatus 30 are connected with each other by wire connection or by wireless connection.

The wide area base station apparatus 20 and each local area base station apparatus 30 are connected with a higher station apparatus, which is not illustrated, and are connected to a core network 50 via the higher station apparatus. Note that the higher station apparatus may be, for example, an access gateway apparatus, a radio network controller (RNC), a mobility management entity (MME) and so on, but is by no means limited to these. Also, the local area base station apparatuses 30 may be connected with the higher station apparatus via the wide area base station apparatus 20.

Note that, although each mobile terminal apparatus 10 may be either an LTE terminal or an LTE-A terminal, in the following description, simply a mobile terminal apparatus will be described, unless specified otherwise. Also, for ease of explanation, although mobile terminal apparatuses will be described to perform radio communication with the wide area base station apparatus 20 and the local area base station apparatuses 30, more generally, user equipment, including mobile terminal apparatuses and fixed terminal apparatuses, may be used as well. Also, the local area base station apparatuses 30 and the wide area base station apparatus 20 may be referred to as "transmission point for the wide area and local areas." Note that the local area base station apparatuses 30 may be optical remote base station apparatuses.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing a system band into bands formed with one or continuous resource blocks per terminal, and allowing a plurality of terminals to use mutually different bands.

Here, communication channels in the LTE system will be described. Downlink communication channels include the PDSCH (Physical Downlink Shared CHannel), which is used by each mobile terminal apparatus 10 on a shared basis, and downlink L1/L2 control channels (the PDCCH, the PCFICH, and the PHICH). User data and higher control information are transmitted by the PDSCH. Scheduling information and so on for the PDSCH and the PUSCH are transmitted by the PDCCH (Physical Downlink Control CHannel). The number of OFDM symbols to use for the PDCCH is transmitted by the PCFICH (Physical Control Format Indicator CHannel). HARQ ACK and NACK for the PUSCH are transmitted by the PHICH (Physical Hybrid-ARQ Indicator CHannel).

Uplink communication channels include the PUSCH (Physical Uplink Shared CHannel), which is used by each mobile terminal apparatus 10 on a shared basis as an uplink data channel, and the PUCCH (Physical Uplink Control CHannel), which is an uplink control channel. User data and higher control information are transmitted by this PUSCH. Also, downlink radio quality information (CQI: Channel Quality Indicator), ACK/NACK and so on are transmitted by the PUCCH.

Figure 11:
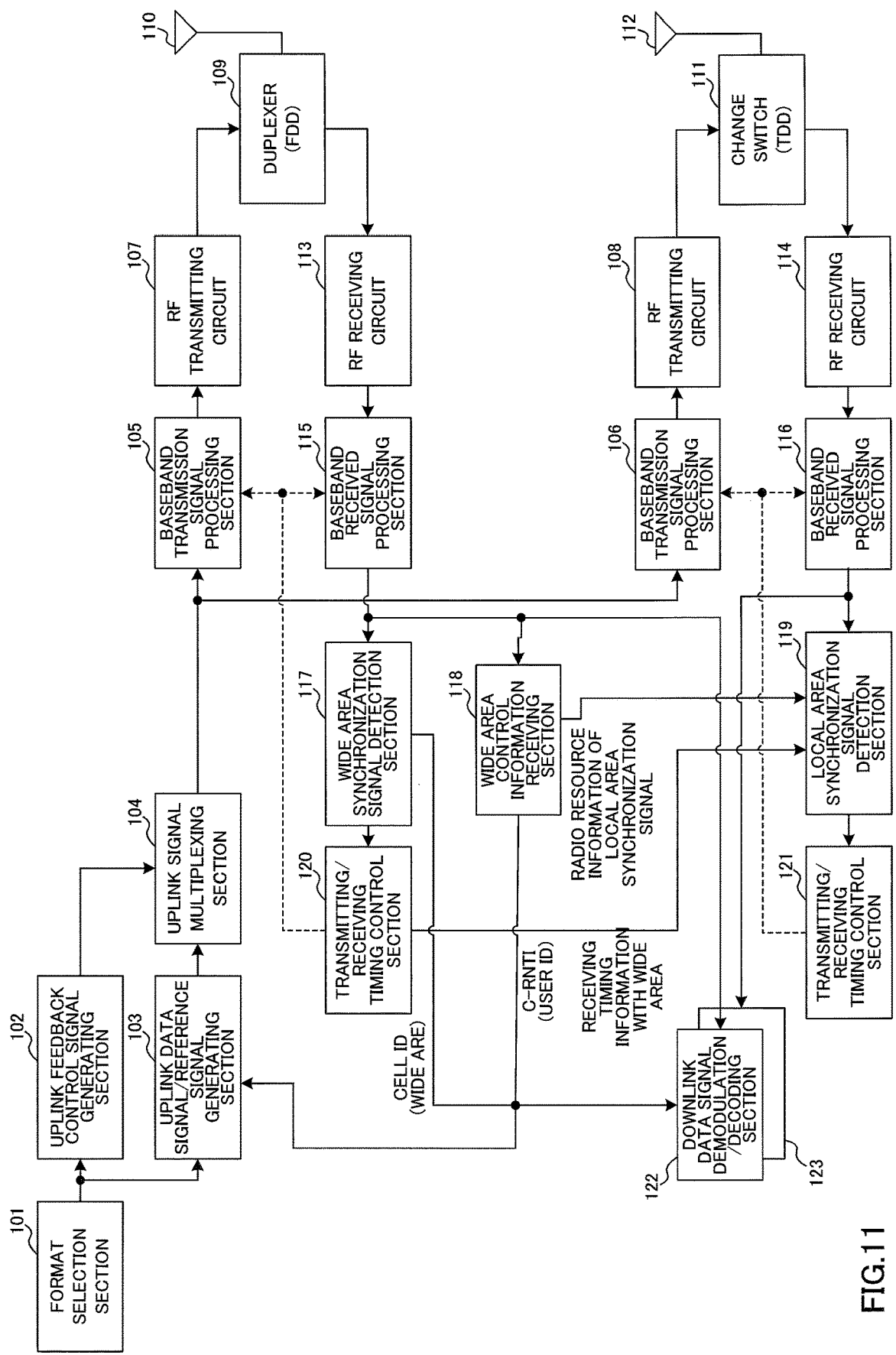
FIG. 11 is a functional block diagram of a mobile terminal apparatus.

An overall configuration of the mobile terminal apparatus 10 will be described with reference to FIG. 11. Note that a configuration to apply the first scrambling method in local areas will be described in the following description. The mobile terminal apparatus 10 has, as processing sections of the transmitting sequence, a format selection section 101, an uplink feedback control signal generating section 102, an uplink data signal/reference signal generating section 103, an uplink signal multiplexing section 104, baseband transmission signal processing sections 105 and 106, and RF transmitting circuits 107 and 108.

The format selection section 101 selects the transmission format for the wide area and the transmission format for the local areas. The uplink feedback control signal generating section 102 generates an uplink feedback control signal, which includes downlink radio quality, a response signal, and so on.

The uplink data signal/reference signal generating section 103 generates an uplink data signal and reference signals. In the event of the transmission format for the wide area, the uplink data signal/reference signal generating section 103 generates reference signals for the wide area, and scrambles reference signals based on the cell ID of the wide area C1. Also, in the event of the transmission format for the wide area, the uplink data signal/reference signal generating section 103 generates an uplink data signal for the wide area, and scrambles the uplink data signal based on the cell ID and C-RNTI of the wide area C1. In the event of the transmission format for the local areas, the uplink data signal/reference signal generating section 103 generates reference signals and an uplink data signal for the local areas, and scrambles reference signals and the uplink data signal based on the cell ID and C-RNTI of the wide area C1.

In this way, the cell ID and C-RNTI of the wide area C1 are used in scrambling of reference signals and a data signal for the local areas. Consequently, it is not necessary to use cell-specific cell IDs of the local areas C2, so that cell planning of the local areas C2 is not needed. Also, common scrambling sequence are used between a plurality of local areas C2. Therefore, even when the local mobile terminal apparatus 10 moves between local areas C2, the scrambling is not changed, so that it is possible to realize smooth mobility between the local areas C2. Note that, the cell ID and C-RNTI are not limited to a configuration reported from the wide area base station apparatus 20, and may be reported from the local area base station apparatuses 30.

The uplink signal multiplexing section 104 multiplexes the uplink feedback control signal, the uplink transmission data, and reference signals. An uplink signal for the wide area base station apparatus 20 is input in the baseband transmission signal processing section 105, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 107, and is transmitted from a transmitting/receiving antenna 110 for the wide area, via a duplexer 109 that is provided between the transmitting sequence and the receiving sequence. In the transmitting/receiving sequences for the wide area, simultaneous transmission/reception is made possible by the duplexer 109.

An uplink signal for the local area base station apparatus 30 is input in the baseband transmission signal processing section 106, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 108, and is transmitted from a transmitting/receiving antenna 112 for the local areas, via a change switch 111 that is provided between the transmitting sequence and the receiving sequence. In the transmitting/receiving sequences for the local areas, transmission and reception are switched by the change switch 111.

Note that although the present embodiment is configured to provide a duplexer 109 in the transmitting/receiving sequences for the wide area and provide the change switch 111 in the transmitting/receiving sequences for the local areas, this configuration is by no means limiting. It is equally possible to provide the change switch 111 in the wide area transmitting/receiving sequences and provide the duplexer 109 in the local area transmitting/receiving sequences. Also, uplink signals for the wide area and the local areas may be transmitted simultaneously from the transmitting/receiving antennas 110 and 112, or may be transmitted separately by switching between the transmitting/receiving antennas 110 and 112.

Also, the mobile terminal apparatus 10 has, as processing sections of the receiving sequence, RF receiving circuits 113 and 114, baseband received signal processing sections 115 and 116, a wide area synchronization signal detection section 117, a wide area control information receiving section 118, a local area synchronization signal detection section 119, transmitting/receiving timing control sections 120 and 121, and downlink data signal demodulation/decoding sections 122 and 123.

A downlink signal from the wide area base station apparatus 20 is received at the wide area transmitting/receiving antenna 110. This downlink signal is input in the baseband received signal processing section 115 via the duplexer 109 and the RF receiving circuit 113, and subjected to digital signal processing. For example, in the event of a downlink signal of the OFDM scheme, the cyclic prefixes are removed, and the signal is converted from a time sequence signal to a frequency domain signal through a fast Fourier transform (FFT).

The wide area synchronization signal detection section 117 detects a wide area synchronization signal from the downlink signal for the wide area, and acquires the cell ID of the wide area C1 included in this wide area synchronization signal. The cell ID of the wide area C1 is input in the downlink data signal demodulation/decoding sections 122 and 123, and uplink data signal/reference signal generating section 103.

The transmitting/receiving timing control section 120 controls the transmission and reception timing in the baseband transmission signal processing section 105 and the baseband received signal processing section 115, based on the wide area synchronization signal detection result by the wide area synchronization signal detection section 117. Also, the transmitting/receiving timing control section 120 outputs receiving timing information with the wide area base station apparatus 20 to the local area synchronization signal detection section 119.

The wide area control information receiving section 118 receives wide area control information from the downlink signal for the wide area. The wide area control information includes C-RNTI (user ID) of the wide area C1 and the radio resource information of the local area synchronization signal. The wide area control information receiving section 118 outputs C-RNTI to the downlink data signal demodulation/decoding sections 122 and 123, and the uplink data signal/reference signal generating section 103. Also, the wide area control information receiving section 118 outputs the radio resource information of the local area synchronization signal to the local area synchronization signal detection section 119. The radio resource information of the local area synchronization signal includes, for example, the transmission interval, the frequency position and the code of the local area synchronization signal. Note that the wide area control information is received via, for example, broadcast information and RRC signaling.

The downlink data signal for the wide area is input in the downlink data signal demodulation/decoding section 123. The cell ID of the wide area C1 from the wide area synchronization signal detection section 117 and C-RNTI of the wide area C1 from the wide area control information receiving section 118 are input to the downlink data signal demodulation/decoding section 123. The downlink data signal demodulation/decoding section 123 descrambles and demodulates the downlink data signal for the wide area based on the cell ID and C-RNTI of the wide area C1.

A downlink signal from the local area base station apparatus 30 is received in the transmitting/receiving antenna 112 for the local areas. This downlink signal is input in the baseband received signal processing section 116 via the change switch 111 and the RF receiving circuit 114, and subjected to digital signal processing. For example, in the event of a downlink signal of the OFDM scheme, the cyclic prefixes are removed, and the signal is converted from a time sequence signal to a frequency domain signal through a fast Fourier transform (FFT).

In the local area synchronization signal detection section 119, the radio resource information of the local area synchronization signal is input from the wide area control information receiving section 118, and receiving timing information with the wide area base station apparatus 20 is input from the transmitting/receiving timing control section 120. The local area synchronization signal detection section 119 detects a local area synchronization signal from the downlink signal for the local areas, based on the radio resource information of the local area synchronization signal and the receiving timing information.

The transmission/reception timing control section 121 controls the transmission and reception timing in the baseband transmission signal processing section 106 and the baseband received signal processing section 116, based on the local area synchronization signal detection result by the local area synchronization signal detection section 119.

The downlink data signal for the local areas is input in downlink data signal demodulation/decoding section 123. In the downlink data signal demodulation/decoding section 123, the cell ID of the wide area C1 from the wide area synchronization signal detection section 117 is input, and C-RNTI of the wide area C1 from the wide area control information receiving section 118 is input. The downlink data signal demodulation/decoding section 123 descrambles and demodulates the downlink data signal for the local areas based on the cell ID and C-RNTI of the wide area C1.

Note that, although an example to apply the first scrambling method to the local areas C2 has been described here, it is equally possible to apply the second to fifth scrambling methods to the local areas C2. In this case, an RNTI that is common between a plurality of local areas and additional IDs may be included in the wide area control information, which is received in the wide area control information receiving section 118. Then, the uplink data signal/reference signal generating section 103 scrambles the data signal based on identifier information such as the RNTI used in each scrambling method. Also, the downlink data signal demodulation/decoding section 123 descrambles the data signal based on identifier information such as the RNTI used in each scrambling method. Also, downlink signals for the wide area and the local areas may be received simultaneously from the transmitting/receiving antennas 110 and 112, or may be received separately by switching between the transmitting/receiving antennas 110 and 112.

Figure 12:
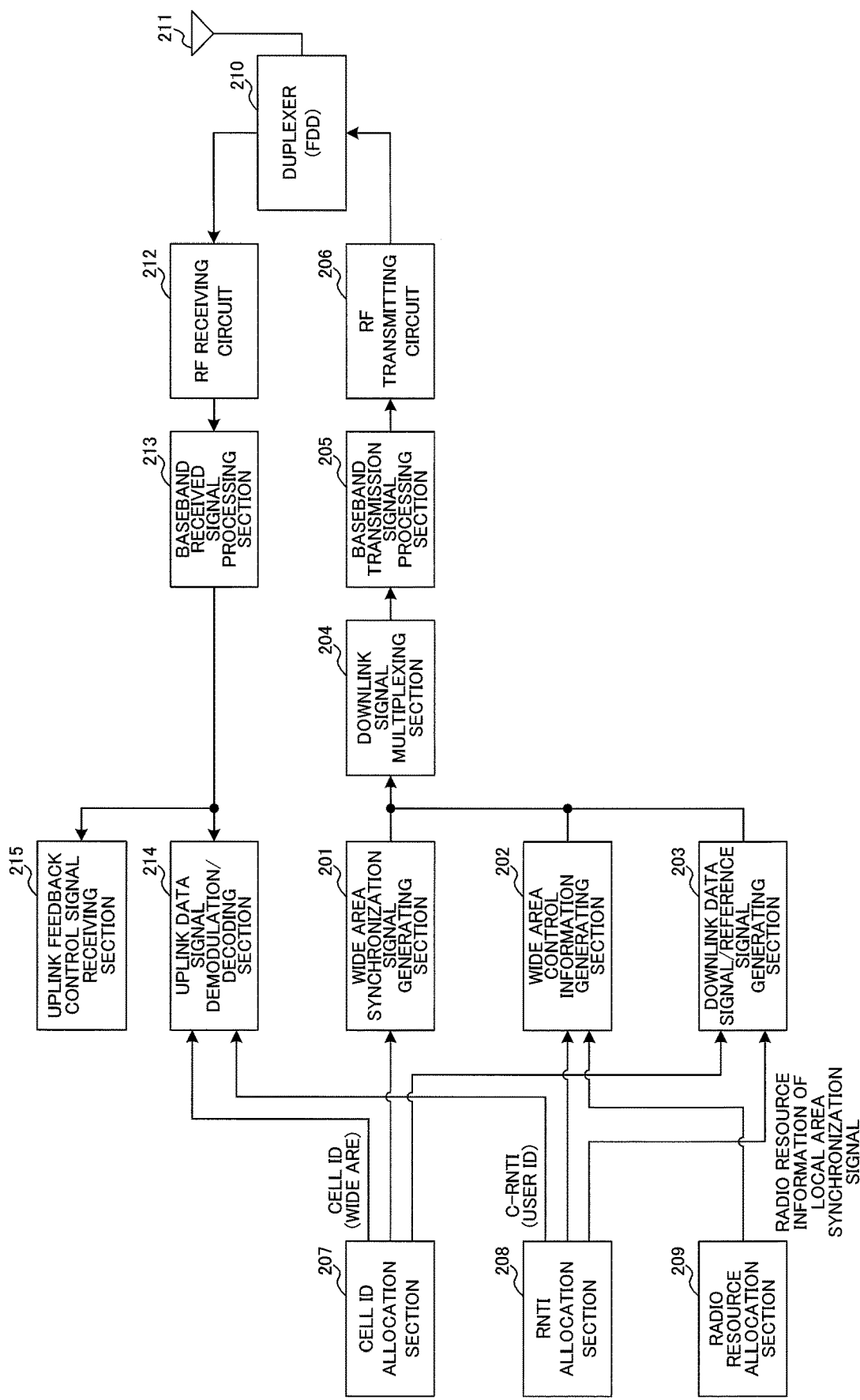
FIG. 12 is a functional block diagram of a wide area base station apparatus.

An overall configuration of the wide area base station apparatus 20 will be described with reference to FIG. 12. Note that a configuration to apply the first scrambling method to local areas will be described in the following description. The wide area base station apparatus 20 has, as processing sections of the transmitting sequence, a wide area synchronization signal generating section 201, a wide area control information generating section 202, a downlink data signal/reference signal generating section 203, a downlink signal multiplexing section 204, a baseband transmission signal processing section 205, and an RF transmitting circuit 206. Also, the wide area base station apparatus 20 has, as control information allocation section, a cell ID allocation section 207, an RNTI allocation section 208, and a radio resource allocation section 209 for the local area synchronization signal.

The wide area synchronization signal generating section 201 generates a wide area synchronization signal including the cell ID input from the cell ID allocation section 207. The wide area control information generating section 202 generates wide area control information including C-RNTI input from the RNTI allocation section 208 and the radio resource information of the local area synchronization signal input from the radio resource allocation section 209. Note that, the wide area control information generating section 202 may generate wide area control information including the cell ID and C-RNTI of the wide area C1, and the radio resource information of the local area synchronization signal.

The downlink data signal/reference signal generating section 203 generates reference signals, and scrambles reference signals based on the cell ID input from the cell ID allocation section 207. Also, the downlink data signal/reference signal generating section 203 generates a downlink data signal, and scrambles the downlink data signal based on the cell ID input from the cell ID allocation section 207 and C-RNTI input from the RNTI allocation section 208. The downlink signal multiplexing section 204 multiplexes the wide area synchronization signal, the wide area control information, the downlink data signal, and reference signals.

A downlink signal for the mobile terminal apparatus 10 is input in the baseband transmission signal processing section 205, and subjected to digital signal processing. For example, in the event of a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 206, and is transmitted from a transmitting/receiving antenna 211 via a duplexer 210 that is provided between the transmitting sequence and the receiving sequence.

Also, the wide area base station apparatus 20 has, as processing sections of the receiving sequence, an RF receiving circuit 212, a baseband received signal processing section 213, an uplink data signal demodulation/decoding section 214, and an uplink feedback control signal receiving section 215.

The uplink signal from the mobile terminal apparatus 10 is received in the transmitting/receiving antenna 211, and is input in the baseband received signal processing section 213 via the duplexer 210 and the RF receiving circuit 212. In the baseband received signal processing section 213, the uplink signal is subjected to digital signal processing. For example, in the event of an uplink signal of the OFDM scheme, the cyclic prefixes are removed, and the signal is converted from a time sequence signal to a frequency domain signal through a fast Fourier transform (FFT).

The uplink data signal is input in the uplink data signal demodulation/decoding section 214. The cell ID of the wide area C1 from the cell ID allocation section 207 and C-RNTI from the RNTI allocation section 208 are input in the uplink data signal demodulation/decoding section 214. The uplink data signal demodulation/decoding section 214 descrambles and demodulates the uplink data signals based on the cell ID of the wide area C1 and C-RNTI. An uplink feedback control signal is input in the uplink feedback control signal receiving section 215.

Note that, although an example to apply the first scrambling method to the local areas C2 has been described here, it is equally possible to apply the second to fifth scrambling methods to the local areas C2. In this case, an RNTI that is common between a plurality of local areas and additional IDs may be included in the wide area control information, which is generated in the wide area control information generating section 202.

Figure 13:
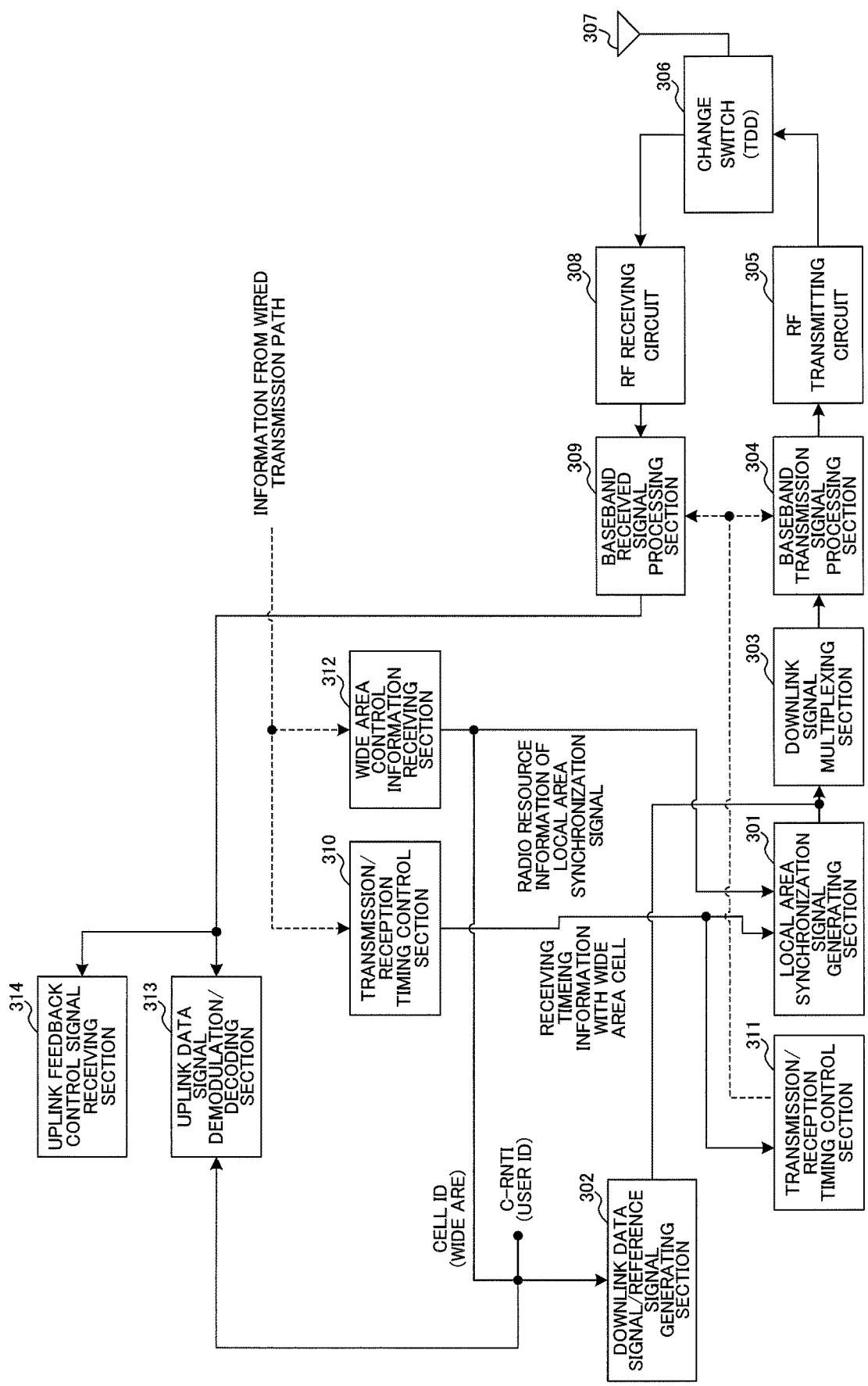
FIG. 13 is a functional block diagram of a local area base station apparatus.

An overall configuration of the local area base station apparatus 30 will be described with reference to FIG. 13. Note that a configuration to apply the first scrambling method to local areas will be described in the following description. Also, assume that C-RNTI is reported in advance from the mobile terminal apparatus 10 to the local area base station apparatus 30. The local area base station apparatus 30 has, as processing sections of the transmitting sequence, a local area synchronization signal generating section 301, a downlink data signal/reference signal generating section 302, a downlink signal multiplexing section 303, a baseband transmission signal processing section 304, and an RF transmitting circuit 305.

The local area synchronization signal generating section 301 generates a local area synchronization signal based on the radio resource information of the local area synchronization signal reported from the wide area base station apparatus 20, and receiving timing information with the wide area base station apparatus 20. For example, in the local area synchronization signal generating section 301, the transmission interval of the local area synchronization signal is input as the radio resource information of the local area synchronization signal. This transmission interval is set large compared to the wide area synchronization signal. The local area synchronization signal generating section 301 generates the local area synchronization signal by setting a comparatively wide transmission interval, based on the receiving timing information with the wide area base station apparatus 20.

The downlink data signal/reference signal generating section 302 generates reference signals and a downlink data signal for the local areas, and scrambles reference signals and the downlink data signal based on the cell ID and C-RNTI of the wide area C1. In this way, by using the cell ID and C-RNTI of the wide area C1 for generating reference signals and scrambling a downlink data signal, there is no need to use cell ID for the local area C2. The downlink signal multiplexing section 303 multiplexes the downlink transmission data, reference signals and the local area synchronization signal.

The downlink signal for the mobile terminal apparatus 10 is input in the baseband transmission signal processing section 304, and subjected to digital signal processing. For example, in the event of a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 305, and is transmitted from a transmitting/receiving antenna 307 via a change switch 306 that is provided between the transmitting sequence and the receiving sequence. Note that a duplexer may be provided instead of the change switch 306.

The local area base station apparatus 30 has, as processing sections of the receiving sequence, an RF receiving circuit 308, a baseband received signal processing section 309, transmission/reception timing control sections 310 and 311, a wide area control information receiving section 312, an uplink data signal demodulation/decoding section 313, and an uplink feedback control signal receiving section 314.

The wide area transmitting/receiving timing control section 310 receives receiving timing information with the wide area base station apparatus 20 from the wide area base station apparatus 20. Also, the wide area transmitting/receiving timing control section 310 outputs the receiving timing information with the wide area base station apparatus 20 to the local area synchronization signal generating section 301 and the transmitting/receiving timing control section 311.

The local area transmission/reception timing control section 311 controls transmission and reception timing in the baseband transmission signal processing section 304 and the baseband received signal processing section 309, based on the receiving timing information with the wide area base station apparatus 20.

The wide area control information receiving section 312 receives wide area control information from the wide area base station apparatus 20. The wide area control information includes the radio resource information of the local area synchronization signal and the cell ID of the wide area C1. The wide area control information receiving section 312 outputs the radio resource information of the local area synchronization signal to the local area synchronization signal generating section 301. The radio resource information of the local area synchronization signal includes, for example, the transmission interval, the frequency position and the code of the local area synchronization signal. Note that the wide area control information may be received via, for example, broadcast information and RRC signaling.

The uplink signal from the mobile terminal apparatus 10 is received in the transmitting/receiving antenna 307 for the local areas, and is input in the baseband received signal processing section 309 via the change switch 306 and the RF receiving circuit 308. In the baseband received signal processing section 309, the uplink signal is subjected to digital signal processing. For example, in the event of an uplink signal of the OFDM scheme, the cyclic prefixes are removed, and the signal is converted from a time sequence signal to a frequency domain signal through a fast Fourier transform (FFT).

An uplink data signal for the local areas is input in the uplink data signal demodulation/decoding section 313. The cell ID of the wide area C1 from the wide area control information receiving section 312 and C-RNTI reported from the mobile terminal apparatus 10 in advance are input in the uplink data signal demodulation/decoding section 313. The uplink data signal demodulation/decoding section 313 descrambles and demodulates the uplink data signal of the local areas based on the cell ID and C-RNTIs. An uplink feedback control signal for the local areas is input in the uplink feedback control signal receiving section 314. The uplink feedback control signal receiving section 314 receives the uplink feedback control signal that is allocated to radio resources of a comparatively wide band or a short transmission time duration to place significance on taking measures against interference.

Note that, although an example to apply the first scrambling method to the local areas C2 has been described here, it is equally possible to apply the second to fifth scrambling methods to the local areas C2. In this case, an RNTI that is common between a plurality of local areas and additional IDs may be included in the wide area control information, which is received in the wide area control information receiving section 312. Then, the downlink data signal/reference signal generating section 302 scrambles the data signal based on identifier information such as the RNTI used in each scrambling method. Also, the uplink data signal demodulation/decoding section 313 descrambles the uplink data signal based on identifier information such as the RNTI used in each scrambling method.

As has been described above, with the radio communication system 1 according to the present embodiment, since scrambling that is common between a plurality of local areas C2 is applied to data signals, even when the mobile terminal apparatus 10 moves across local areas C2, scrambling is not changed. Consequently, it is possible to support smooth mobility between the local areas C2.

The present invention is by no means limited to the above embodiment and can be implemented in various modifications. For example, without departing from the scope of the present invention, it is possible to adequately change the number of carriers, the bandwidth of carriers, the signaling method, the number of procession sections, the order of processing steps in the above description, and implement the present invention. Besides, the present invention can be implemented with various changes, without departing from the scope of the present invention.

For example, with the present embodiment, although a communication system to define a new frequency carrier for the local areas is applied to the present invention, this configuration is by no means limiting. The present invention is also applicable to a case where the same radio communication scheme as in the wide area is used in the local areas. Therefore, the same carrier may be applied between the wide area and the local areas.

The disclosure of Japanese Patent Application No. 2012-165175, filed on Jul. 25, 2012, including the specification, drawings and abstract, is incorporated herein by reference in its entirety.

The invention claimed is:

1. A mobile terminal apparatus comprising: a scrambling section that scrambles an uplink shared data channel to be transmitted in a first cell and an uplink shared data channel to be transmitted in a second cell, by scrambling sequences on based RNTIs; and a transmission section that transmits a scrambled uplink shared data channel to a first base station apparatus covering the first cell and/or a second base station apparatus covering the second cell, wherein a first RNTI used in scrambling of the uplink shared data channel to be transmitted in the first cell and a second RNTI used in scrambling of the uplink shared data channel to be transmitted in the second cell are independently allocated to the mobile terminal apparatus, wherein the mobile terminal apparatus connects, by dual connectivity, to the first base station in the first cell using a first frequency and the second base station in the second cell using a second frequency that is different from the first frequency, wherein the uplink shared data channels are allocated by using different radio parameters in the first and second cells, wherein the radio parameters are at least one of transmission time interval (TTI) length, cyclic prefix (CP) length, subcarrier interval and resource block width, and wherein the TTI length for the first cell is set longer than that of the second cell.

2. The mobile terminal apparatus according to claim 1, wherein, when the second cell comprises a plurality of second cells, the scrambling section applies same RNTI to scrambling of uplink shared data channels to be transmitted in the plurality of second cells.

3. The mobile terminal apparatus according to claim 1, wherein the scrambling section scrambles the uplink shared data channel to be transmitted in the second cell by using a virtual cell ID in addition to the second RNTI.

4. The mobile terminal apparatus according to claim 1, wherein the subcarrier interval for the first cell is set shorter than that for the second cell.

5. The mobile terminal apparatus according to claim 1, wherein the scrambling section scrambles the uplink shared data channel to be transmitted in the second cell by using the scrambling sequences based on equation (1) that includes a given RNTI $$c_{init}=n_{RNTI} \cdot 2^{14}+q \cdot 2^{13}+\lfloor n_s/2 \rfloor \cdot 2^9+N_{ID}^{cell} \qquad \text{(Equation 1)}.$$

6. The mobile terminal apparatus according to claim 1, wherein the scrambling section scrambles the uplink shared data channel to be transmitted in the first cell and the uplink shared data channel to be transmitted in the second cell by scrambling sequences based on cell IDs and RNTIs.

7. A base station apparatus that communicates with a mobile terminal apparatus, the base station apparatus comprising: a scrambling section that scrambles a downlink shared data channel to be transmitted in a second cell by a scrambling sequence based on an RNTI; and a transmission section that transmits a scrambled downlink shared data channel to the mobile terminal apparatus, wherein the RNTI used in scrambling of the downlink shared data channel to be transmitted in the second cell is allocated independently from a RNTI used in scrambling of a downlink shared data channel to be transmitted in a first cell, wherein the mobile terminal apparatus connects, by dual connectivity, to another base station in the first cell using a first frequency and the base station in the second cell using a second frequency that is different from the first frequency, wherein the uplink shared data channels are allocated by using different radio parameters in the first and second cells, wherein the radio parameters are at least one of transmission time interval (TTI) length, cyclic prefix (CP) length, subcarrier interval and resource block width, and wherein the TTI length for the second cell is set shorter than that of the first cell.

8. The base station apparatus according to claim 7, wherein the subcarrier interval for the second cell is set longer than that for the first cell.

9. The base station apparatus according to claim 7, wherein the scrambling section scrambles the down link shared data channel to be transmitted in the second cell by a scrambling sequence based on a cell ID and an RNTI.

* * * * *